United States Patent Office 3,781,421
Patented Dec. 25, 1973

3,781,421
COMPOSITIONS FOR THE NUTRITION OF ANIMALS
Denise Mancy, Charenton, and Leon Ninet and Jean Preud'Homme, Paris, France, assignors to Rhone-Poulenc S.A., Paris, France
No Drawing. Continuation-in-part of application Ser. No. 507,773, Nov. 15, 1965, now Patent No. 3,658,987, and a continuation of abandoned application Ser. No. 625,951, Mar. 27, 1967. This application Jan. 10, 1972, Ser. No. 216,830
Claims priority, application France, Nov. 18, 1964, 995,376; Apr. 4, 1966, 56,322
Int. Cl. A61k 21/00
U.S. Cl. 424—118    6 Claims

ABSTRACT OF THE DISCLOSURE

The antibiotic 8,036 R.P.—produced by the culture of *Streptomyces canadiensis* (NRRL 3155)—is used as a supplement for animal feedstuffs to accelerate the growth of domestic animals, more especially poultry.

---

This application is a continuation-in-part of our application Ser. No. 507,773, filed Nov. 15, 1965, now Pat. No. 3,658,987, and a continuation of our application No. 625,951, filed Mar. 27th 1967, now abandoned.

This invention relates to compositions for the nutrition of animals and more particularly to compositions for speeding up growth of animals.

It is known that various favourable effects, for example, on the rate of growth and on the state of health may be obtained by the addition of certain products in the diet of animals. Such products are present, for example, in the meat and fish meals used as additional elements of animal food. It has also been found that certain synthetic products, antibiotics such as penicillin and chlortetracycline or vitamins such as vitamin B12, added to the rations of animals such as chickens, turkeys, calves and pigs produce in varying degrees these favourable effects on the development of the animal.

In our application Ser. No. 507,773, filed Nov. 15, 1966, we have described the antibiotic 8,036 R.P. and its production by the culture of the microorganism "*Steptomyces canadiensis*" (deposited at the Northern Regional Research Laboratory of Peoria, Ill., United States of America, under the number NRRL 3155) and stated that the said antibiotic possesses interesting antibacterial properties which makes it therapeutically useful.

It has now been found after research and experimentation that 8,036 R.P. has important anabolic properties and that, when added to the feedstuff of animals, it causes much more rapid increase in weight than has been noted with entirely natural feeds and is twice as effective as an animal growth factor than chlortetracycline, which is one of the best of the previously known factors. 8,036 R.P. has the advantage of being very stable on storage and of being miscible with all substances normally included in an animal diet without deterioration on storage.

Animal feedstuffs according to the invention may be used in the nutrition of all livestock but it is particularly on poultry that they are most efficacious. The quantities of 8,036 R.P. to be added to the rations may naturally vary within quite wide limits according to the species of animal and according to the value of the feeds themselves. As a general rule, it is sufficient for the feedstuff rations placed before the animals to contain 1 to 20 g. of 8,036 R.P. per metric ton of feedstuff. Animal feedstuffs in concentrate form containing a quantity of the antibiotic greater than 20 g. per metric ton are also within the scope of the invention.

The following example illustrates animal feedstuffs according to the invention.

EXAMPLE

Antibiotic 8,036 R.P. was used in feeding chicks receiving a basic feedstuff of the following average composition (per 100 kg.):

|  | Kg. |
|---|---|
| Maize | 50 |
| Wheat | 15 |
| Soyabean flour | 23 |
| Fish meal | 6 |
| Meat meal | 2 |
| Hydrolysed fish | 1.5 |
| Inorganic salts and vitamins | 2.5 |

The chicks, which were of the Vantress x Arbor Acres strain, were divided at the age of two days into 24 batches of 15 individuals (12 batches of cockerels "C" and 12 batches of pullets "P") which were as homogeneous as possible. They were raised in warm batteries up to the age of 4 weeks and then in cold batteries.

The three following formulations were each compared for eight batches:

(1) Standard (without additive)
(2) Chlortetracycline (10 g. per metric ton of feedstuff)
(3) 8,036 R.P. sodium salt (10 g. permetric ton of feedstuff)

The average weights at 8 weeks are given in the following table.

TABLE

|  |  | In grams | In percent of standard |
|---|---|---|---|
| Standard | C | 1,651 |  |
|  | P | 1,388 |  |
|  | Average | 1,519 | 100 |
| Chlortetracycline | C | 1,668 |  |
|  | P | 1,416 |  |
|  | Average | 1,542 | 101.4 |
| 8,036 R.P. | C | 1,692 |  |
|  | P | 1,435 |  |
|  | Average | 1,564 | 102.9 |

These results show that 8,036 R.P. is twice as effective as chlortetracycline as a growth-promoter for animals.

We claim:
1. A method of accelerating the growth of a domestic animal which comprises feeding to the animal a feedstuff acceptable to the animal and containing a growth-accelerating effective amount of 8,036 R.P.
2. A method of accelerating the growth of poultry which comprises supplementing the diet of the poultry with a growth-accelerating effective amount of 8,036 R.P.
3. A method as claimed in claim 1 wherein the content of 8,036 R.P. in the feedstuff lies between 1 and 20 grams per metric ton of feedstuff.
4. A method as claimed in claim 2 wherein the content of 8,036 R.P. in the feedstuff lies between 1 and 20 grams per metric ton of feedstuff.
5. A composition comprising an animal feedstuff and a growth-accelerating effective amount of 8,036 R.P.
6. A composition as claimed in claim 5 wherein the content of 8,036 R.P. lies between 1 and 20 grams per metric ton of feedstuff.

References Cited

Derwent Farm Doc. No. 21,495, Abstracting South African Patent No. 65/6,204, published May 18, 1966.

JEROME D. GOLDBERG, Primary Examiner